United States Patent [19]

Benson et al.

[11] 4,194,574

[45] Mar. 25, 1980

[54] DRAFT POWER SENSOR AND METHOD FOR IMPROVING PERFORMANCE IN EARTHMOVING EQUIPMENT

[75] Inventors: Harvey S. Benson, Medina County; Charles D. Wood, III, Bexar County, both of Tex.

[73] Assignee: Southwest Research Institute, San Antonio, Tex.

[21] Appl. No.: 832,724

[22] Filed: Sep. 13, 1977

[51] Int. Cl.² ............... E02F 3/76; A01B 63/112
[52] U.S. Cl. ............................ 172/430; 172/7
[58] Field of Search .......... 172/2, 3, 4, 7, 9, 430; 343/5 PM, 7 VC, 7 VM, 112 CA; 73/117.3

[56] References Cited

U.S. PATENT DOCUMENTS

| | | | |
|---|---|---|---|
| 2,585,605 | 2/1952 | Wallace | 343/112 CA UX |
| 2,605,393 | 7/1952 | Holm | 343/112 CA UX |
| 2,654,301 | 10/1953 | Bohmker | 172/2 |
| 3,094,693 | 6/1963 | Taylor | 343/7 VM |
| 3,246,701 | 4/1966 | Schulz | 172/9 |
| 3,686,941 | 8/1972 | Kramasz, Jr. et al. | 73/117.3 |
| 3,716,104 | 2/1973 | Koenig et al. | 172/7 |
| 3,716,104 | 2/1973 | Koenig et al. | 172/7 |
| 3,803,574 | 4/1974 | Logue | 172/2 X |

FOREIGN PATENT DOCUMENTS 2508620 8/1975 Fed. Rep. of Germany ............. 172/7

OTHER PUBLICATIONS

"New Tricks for the Seabee Bulldozer," *The Naval Civil Engineer*, Fall 1974, pp. 42, 43.
"Tractor Earth Blading at High Speeds-Now a Reality," by E. T. Small, SAE Paper 998B, Jan. 1965.

*Primary Examiner*—Richard T. Stouffer
*Attorney, Agent, or Firm*—Gustav N. Van Steenberg

[57] ABSTRACT

A draft power sensor is shown which is capable of determining the amount of power being applied to the soil in earthmoving equipment. The effective draft force and the true ground speed of the earthmoving equipment are measured. This information is processed electronically to provide the product of the two values, which is the draft power. Production from earthmoving equipment can be maximized if the highest value of the draft power is maintained.

11 Claims, 2 Drawing Figures

DRAFT POWER SENSOR AND METHOD FOR IMPROVING PERFORMANCE IN EARTHMOVING EQUIPMENT

BACKGROUND OF THE INVENTION

The invention relates to draft power sensors and, more particularly, to draft power sensors which are able to measure the effective draft force and true ground speed of earthmoving equipment and provide a product of the two measurements. The product, called the draft power, is a measure of the power applied to the soil. Maximum production of earthmoving equipment can be achieved if the highest value of draft power is maintained during operation of the equipment.

BRIEF DESCRIPTION OF THE PRIOR ART

The production rate of earthmoving equipment is conventionally measured in cubic yards of soil moved per hour in a particular work situation. The production rate achieved is almost entirely dependent upon the skill of the operator, who must continuously adjust the equipment to maximize the production rate. Production rate for a given type of equipment can be increased by improving the skill of the operator during the dig and transfer processes.

In conventional bulldozing, for example, the operator can only judge production rate in qualitative fashion by sensing forward speed engine lug-down, track slippage, and the quantity of soil being carried by the blade. Human senses are inadequate to combine these inputs into a continuous quantitative measure of production rate that can be sustained for a period of several hours. Also, operator skill varies widely, and the least skilfull operators may move earth at a rate equal to only a small fraction of that of the best operators.

The distance that soil is pushed by a bulldozer has a dramatic effect on the production rate of the equipment. As the distance over which the soil is transferred or pushed is increased, the effective volume of soil moved per unit of time decreases. The density of the soil being transferred also affects the production rate. If the production rate is measured in volume of soil moved per unit of time, the rate will decrease as the density of the soil increases. A more accurate measure of production rate is obtained if it is defined in terms of weight of soil moved per unit of time multiplied by the distance the soil is moved. This method of calculation accounts for the effect of transfer distance and is a measure of the useful rate of work actually achieved.

Only the most experienced operators can attain and maintain high production rates. Less experienced operators will move less soil than the experienced operators because of their inability to accurately judge vehicle speed, the onset of track slippage, and the soil load pushed by the blade. Experience is also necessary to adequately control the blade height in order to doze smoothly and in an optimal manner.

Inexperienced operators may overreach and lower or raise the dozer blade too much and either stall the tractor or doze ineffectively with a small load on the blade. Dozing errors, such as these, will noticeably affect the overall production if allowed to continue. The effects of inexperience upon dozer production are even more pronounced when dozing under poor traction conditions.

The simple slot dozing process can be divided into the dig, transfer and return elements during a typical dozing cycle. During the dig element, the operator loads the blade by lowering the blade into the soil while at normal speed. At this point the force on the dozer blade increases as the soil load builds up in front of the blade. If the blade is lowered too deep, the traction between the tractor tracks and the ground will break, and the forward speed will be significantly reduced. The most productive dig technique involves loading the blade at the optimum rate. This requires the draft force to increase as rapidly as possible while maintaining a relatively high rate of speed. When the blade is fully loaded, the soil is transferred to the desired location. During the transfer element of the cycle, a small amount of soil is dug up to make up for the soil rolling off each side of the blade, creating two windrows. The draft force, during the transfer process, is due to blade shear forces of digging and the frictional resistance of the soil being pushed against the blade. The operator normally adjusts the blade position slightly in order to maintain the full blade load and transfer the load as rapidly as possible. The draft force influences the vehicle speed significantly when dozing at high loads. Therefore, the adjustment of blade position affects both draft force and speed. Efficient soil movement requires good judgment of vehicle speed, which is not measured on dozers, and of blade load, which cannot be seen by the operator. The only way an operator can judge the blade load is by observing the size of the windrow coming off the side of the blade. After the soil is placed in the desired location, the operator backs the tractor to a new starting position during the return element, and digs a new load of dirt to begin a new cycle. Operator skill is also required for achieving a smoother dozer cut as opposed to a rough, rolling cut. A smooth cut results in better traction and less wear and tear on both operator and machine when backing over the cut on the return.

A limited amount of prior work has been accomplished in the general field of controlling earthmoving equipment. The Naval Civil Engineering Laboratory at Pt. Hueneme, Calif., has recently developed a laser-controlled earthmoving equipment system to help dozers, scrapers, and graders hold grade. An explanation of the objectives and methods used is reported in "New Tricks for the Seabee Bulldozer," Navy Civil Engineer, Fall 1974, p. 42. A feature of this system is an engine speed sensor that controls cutting blade height. No means are provided to measure true ground speed, and the blade height control is primarily a method to prevent engine stall-out.

The Army investigated a dozer control in the mid-60's that purported to allow automatic high-speed dozing. The research effort was reported by E. T. Small in "Tractor Earth Blading at High Speeds—Now a Reality," SAE Paper 998B, January 1965. Mechanical devices were provided that allowed for dozer pitch-over after starting a cut to prevent the blade from penetrating too deeply.

Neither of these systems attempted to maximize the power applied to the soil, but instead, they provided means to hold grade while dozing.

SUMMARY OF THE INVENTION

It is an object of the present invention to provide a means to quantitatively measure and display production rate of earthmoving equipment.

It is another object of this invention to improve production of earthmoving equipment.

It is a further object of this invention to measure the draft power of earthmoving equipment.

The engine power during earthmoving operations is used to push the soil, slip the tracks or the wheels, overcome friction and accessory power losses, and lift the weight of the equipment on slopes. This relationship is shown in a dimensionless and qualitative form by the following equation:

$$E = DS + DV + A \pm V(W \sin \theta) \qquad (1)$$

where
- E = total engine power
- D = draft force
- S = slip velocity relative to ground
- V = true ground speed or vehicle velocity relative to ground
- A = friction and accessory power
- W = gross vehicle weight
- $\theta$ = angle of slope, positive upward The rate of actual useful work being done in moving soil is expressed in the term (DV), the product of draft force and true tractor speed and is defined as draft power. When this draft power is maximized, the useful work being done is maximized. Consider first that zero draft force or zero true ground speed produces zero useful work. Between these two extremes there exists a single maximum value of the product of draft force times true ground speed. All of the remaining terms are variable, but for any condition, maximizing the product DV results in a maximum useful work effort. Slip loss will change with soil condition, grade, vehicle weight, and track condition; and it can vary from zero to a value equal to the engine power less accessory losses. To assess the actual work rate of the earthmoving equipment, true ground speed and draft force must be known.

In order for the equipment operator to use these power relations to maximize production, draft power is converted into suitable signals that are displayed on an analog meter readout on the instrument panel, a blinking light, and a sonic indication through earphones or a loudspeaker. High work rates will result in corresponding signals to the operator, both visually and aurally. Consider the simple case where the operator is leveling a worked-over area with a bulldozer. As the tractor starts forward, draft power (DV) is zero, and then, as the blade is lowered and digs into the soil, draft increase and with it, the draft power increases. This fact is communicated to the operator by a faster tone repetition rate in the headset or loudspeaker, faster blinking of the light, and increasing deflection on the draft power meter. As the blade digs deeper, draft force continues to rise, but velocity decreases. Depending on soil type, engine power, and track slip, at some point the tractor is moving at the best true groundspeed commensurate with draft force. This condition corresponds to maximum draft power (DV). Under these conditions, the draft power meter is at its maximum value, the headset tone is keeping at its fastest rate, and the light is blinking at its fastest rate. If the blade is allowed to penetrate even deeper or if the load of material being carried by the blade increases, the actual work being done decreases because true groundspeed begins to fall more rapidly than draft force can increase. This information is immediately presented to the operator by a lowering of the tone rate, a decrease in meter needle deflection, and slower blinking of the light. The operator, by making small adjustments of the blade height, can determine both the direction and the extent of the blade movement necessary to produce maximum draft power.

Next, assume the soil has very poor traction, and the tracks begin to slip badly. Draft power decreases, and the blade is raised in order to decrease draft and reestablish groundspeed by reduction of slip. Even under these poor dozing conditions, the operator can make the best of the situation and produce the most work possible by use of the draft power monitoring system.

DESCRIPTION OF THE PREFERRED EMBODIMENT

Figure 1:
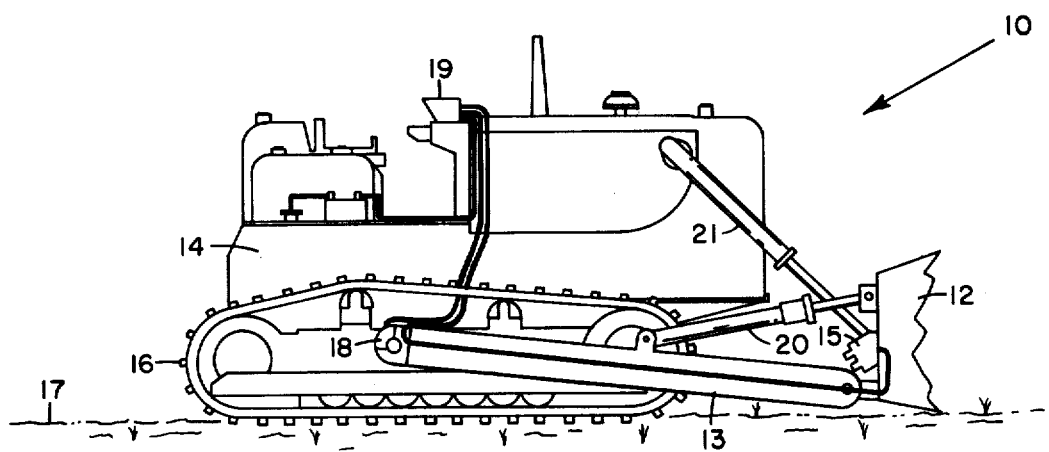
FIG. 1 is a view of the draft power sensor system installed on a tractor with a bulldozer.

Referring to FIG. 1, there is shown earthmoving equipment represented generally by reference number 10. The bulldozer blade 12 is attached to each side of the tractor 14 by a pusharm 13. The true groundspeed sensor package 15 and the draft force sensor 18 furnish information to the electronics circuit box 19 where the information is processed to obtain the product DV in equation 1, defined as draft power. The angle of bulldozer blade 12 is controlled by extending or retracting the cylinder 20, and the height of the bulldozer blade is controlled by extending or retracting cylinder 21. The true groundspeed sensor package 15 determines the true groundspeed of the tractor 14 and can also determine if there is a loss of traction between the track 16 and the soil 17.

Figure 2:
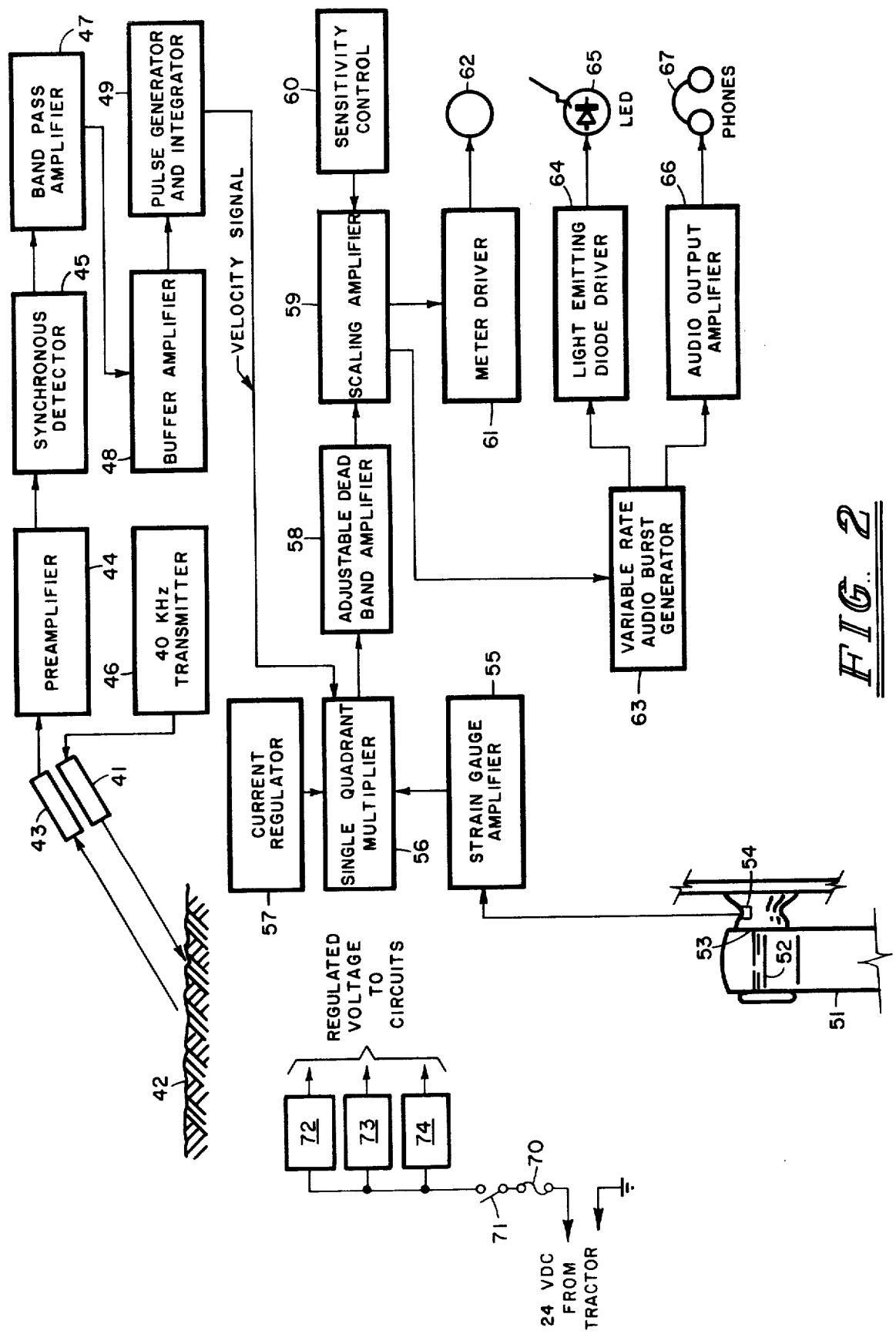
FIG. 2 is a functional block diagram of a draft power sensor system.

Referring now to FIG. 2, the detailed operation of the draft power sensor system will be described. Vehicle velocity is sensed by means of determining the doppler shift of a transmitted ultrasonic beam caused by the velocity of the earthmoving equipment. Transmitter 46 generates a nominal 40 kHz signal which drives an ultrasonic transmit transducer 41. The ultrasonic beam emitted by transmit transducer 41 is reflected from the soil 42 and is received by receive transducer 43. The received signal is amplified in preamplifier 44 and then further amplified and synchronously detected in synchronous detector 45. The output of synchronous detector 45 is the difference frequency between the nominal 40 kHz signal transmitted by transmit transducer 41 and the nominal 40 kHz + doppler shift signal received by receive transducer 43. The doppler shift signal is directly proportional to the velocity of the tractor 14 over the soil 17 as shown in FIG. 1. This resulting signal is amplified and band-limited in band pass amplifier 47 and further amplified in buffer amplifier 48. The signal is then fed to pulse generator and integrator 49 which produces a fixed geometry pulse each time the signal has a zero crossing. The resulting train of uniform pulses has a repetition rate corresponding to the frequency of the doppler signal. When the train is integrated, a DC voltage proportional to the vehicle velocity is produced as an output of the pulse generator and integrator 49. This output is referred to as the velocity signal.

Other means such as a spiked fifth wheel in contact with the ground or optical techniques are also feasible means for detecting the true ground speed.

Bulldozer blade draft forces are sensed by a strain gauge rosette 54, mounted in a protected location on the neck of the trunnion ball 52 to which one of the pusharms 51 is mounted. The force generated by the tractor 14 in FIG. 1 is transferred to the blade 12 through the trunnion ball 52. The low level DC signal voltages proportional to the draft force which are generated by strain gauge 54 are fed to strain gauge amplifier 55. The output from strain gauge amplifier 55 is the draft signal. An alternate approach such as hydraulic or direct deflection means can also be used to obtain the draft force.

The velocity signal and the draft signal voltages are multiplied in the single quadrant multiplier 56. The single quadrant multiplier operates as follows: current regulator 57 supplies a fixed charging current to a storage capacitor which charges at a constant rate producing a linear positive going ramp voltage. One section of single quadrant multiplier 56 allows the capacitor to charge at this regulated rate and another section periodically rapidly discharges it to produce a sawtooth voltage waveform. Component values may be selected to obtain a peak sawtooth voltage uniform amplitude of about 10 volts at a nominal frequency of 1000 Hz. The sawtooth voltage waveform is the reference against which the velocity signal voltage is compared to produce a rectangular waveform with positive state time duration proportional to velocity. The positive amplitude of this rectangular waveform is made draft force dependent so that a final signal waveform is produced having an amplitude proportional to draft force and having a mark/space ratio proportional to velocity. The integrated value of the variable rectangular waveform is the product DV in equation 1. The signal voltage DV is buffered by the adjustable dead band amplifier 58 which can be set to eliminate the effects of vibration and other low-level, short-term shocks on the bulldozer blade 12. The waveform of resulting signal voltage DV supplied to the scaling amplifier 59 is smooth and varies in response to the integrated forces rather than in response to the instantaneous forces on the bulldozer blade 12. The scaling amplifier 59 has a variable gain controlled by the tractor operator and is referred to as sensitivity control 60.

The output of scaling amplifier 59 is fed directly to meter driver 61 which furnishes current to drive the front panel meter 62. The tractor operator can observe the draft power on the meter 62. The output from scaling amplifier 59 is also fed to a variable rate audio burst generator 63 which produces short bursts of signals in the audible frequency range. Preferably, the frequency of the bursts is about 400 Hz. The generator 63 produces about one burst per second with zero input voltage from scaling amplifier 59. The burst rate increases to about 10 per second as the input signal from scaling amplifier 59 rises to ten volts. This variable rate signal output from generator 63, which is proportional to DV, is fed to light-emitting diode driver 64 and audio output amplifier 66. Light-emitting diode driver 64 provides power to a light-emitting diode 65 located on the front panel and can be observed by the tractor operator to provide him with an indication of the draft power. Audio output amplifier 66 provides power to a headset 67 which can be worn by the tractor operator to obtain an audible indication of draft power.

All circuitry in the system is powered by single polarity voltage sources derived directly from the 24 VDC electrical system of tractor 12. The 24 VDC voltage is regulated by using integrated circuits 72, 73 and 74 as shown in FIG. 2. The power supply has an on-off switch 71 and is protected by a fuse 70.

Components for the draft power sensor system circuits are off-the-shelf items. Typical integrated circuits such as, for example, Motorola MC 1555U can be used for transmitter 46; MC 1590 for synchronous detector 45; MC 1558U for band pass amplifier 47, buffer amplifier 48, and strain gauge amplifier 55; MC 3301P for pulse generator and integrator 49; MC 3302P for single quadrant multiplier 56, adjustable dead band amplifier 58, scaling amplifier 59, and variable burst rate generator 63; and MC 1723L for integrated circuits 72, 73 and 74. Standard transistors such as, for example, a 2N5163 can be used for preamplifier 44 and current regulator 57. A 2N3391A can be used for meter driver 61; a 2N2222 can be used for light-emitting diode driver 64; and a 2N5191 can be used for audio output amplifier 66. Transmit transducer 41 and receive transducer 42 are also off-the-shelf items and can be, for example, Linden laboratories, Inc., P/N70100 transducers.

The foregoing is directed to the preferred embodiment, but the scope thereof is determined by the claims which follow.

We claim:
1. Apparatus for determining the draft power of earth-moving equipment, said apparatus comprising:
    (a) a detecting means to measure the true ground speed of said earthmoving equipment;
    (b) detecting means to measure the draft force applied to the soil by said earthmoving equipment;
    (c) means for processing information obtained from said detecting means to measure true ground speed and information obtained from said detecting means to measure draft force, to derive a product which is draft power.
2. The apparatus of claim 1 wherein the detecting means to determine the true ground speed of said earthmoving equipment includes means to detect the doppler frequency shift of a signal where said doppler frequency shift is caused by the motion of said earthmoving equipment relative to the surface over which it is moving.
3. The apparatus of claim 1 wherein the detecting means to measure the draft force applied to the soil by said earthmoving equipment includes a strain gauge.
4. The apparatus of claim 1 further including means to provide the operator of said earthmoving equipment with an indication of said draft power.
5. The apparatus of claim 4 wherein the means to provide the operator of said earthmoving equipment with an indication of said draft power includes aural means.
6. The apparatus of claim 4 wherein the means to provide the operator of said earthmoving equipment with an indication of said draft power includes visual means.
7. A method for determining the draft power of earthmoving equipment comprising the steps of
    (a) measuring the true ground speed of said earthmoving equipment;
    (b) measuring the draft force applied by said earthmoving equipment
    (c) processing the measured value of said true ground speed and the value of said draft force to obtain draft power.
8. The method of claim 7 including the additional step of displaying the draft power to the operator of said earthmoving equipment.
9. The method of claim 7 wherein the true ground speed of said earthmoving equipment is measured by determining the doppler frequency shift of a signal where said doppler frequency shift is caused by the motion of said earthmoving equipment relative to the surface over which it is moving.

10. The method of claim 7 wherein said draft force is measured by a strain gauge.

11. The method of claim 7 wherein said processing includes multiplying the measured value of the true ground speed and the measured value of the draft force to obtain a product which is draft power.

* * * * *